United States Patent [19]

Fritsch

[11] 4,059,355
[45] Nov. 22, 1977

[54] MICRO-COMPOSING REDUCTION PRINTER

[75] Inventor: Robert E. Fritsch, Fort Wayne, Ind.
[73] Assignee: Micro-Copy, Inc., Fort Wayne, Ind.
[21] Appl. No.: 739,601
[22] Filed: Nov. 8, 1976
[51] Int. Cl.² .................. G03B 27/52; G03B 27/70
[52] U.S. Cl. .................................. 355/43; 355/45; 355/65
[58] Field of Search ................. 355/40–43, 355/44, 45, 65, 66

[56] References Cited

U.S. PATENT DOCUMENTS

| | | | |
|---|---|---|---|
| 3,185,026 | 5/1965 | Carlson et al. | 355/45 X |
| 3,652,157 | 3/1972 | Blackert et al. | 355/45 X |
| 3,759,611 | 9/1973 | O'Connell et al. | 355/43 |
| 3,932,036 | 1/1976 | Ueda et al. | 355/40 |
| 3,947,190 | 3/1976 | Otubo et al. | 355/43 X |

FOREIGN PATENT DOCUMENTS

| | | | |
|---|---|---|---|
| 127,575 | 8/1954 | U.S.S.R. | 355/43 |

*Primary Examiner*—Richard A. Wintercorn
*Attorney, Agent, or Firm*—Gust, Irish, Jeffers & Rickert

[57] ABSTRACT

Apparatus for reformating previously photographed data including a single light source and a mirror system for directing the light from the source in first and/or second mutually perpendicular axes which intersect at a point. Developed photographic roll film is advanced in a first plane past a first location which is spaced from the intersection point on one side thereof, the first axis passing through the first location and being perpendicular to the first plane. Developed photographic slides are positioned at a second location in a second plane perpendicular to the first plane, the second location being spaced from the intersection point on one side thereof and the second axis passing through the second location and being perpendicular to the second plane. A beamed splitting mirror is positioned at the intersection point for passing a part of the light in the first axis and reflecting the remaining part in the second axis, and a viewing screen is positioned on the first axis spaced from the intersection point on the other side thereof for viewing the light image from the beam splitting mirror. Unexposed and undeveloped photographic film is positioned in the third plane at a third location which is spaced from the intersection point on the other side thereof, the second axis passing through the third location and being perpendicular to the third plane. A lens on the second axis reduces the size of the image projected on the unexposed and undeveloped film, and the unexposed and undeveloped film is supported on a platform selectively movable in X-Y axes in a plane parallel with the third plane so as selectively to position the image on the unexposed and undeveloped film to provide a microfiche format.

21 Claims, 13 Drawing Figures

MICRO-COMPOSING REDUCTION PRINTER

BACKGROUND OF THE INVENTION

1. Field of the Invention

This invention relates generally to photocopying apparatus, and more particularly to apparatus for reformating previously photographed data.

2. Description of the Prior Art

A microfiche is a section of photographic film, typically 105 mm by 148 mm, having a plurality of individual images thereon; the more common microfiche have 14 columns of images in 7 rows for a maximum of 98 frames with a reduction of 24 (from an 8½ inch by 11 inch sheet), 25 columns of images in 13 rows for a maximum of 325 frames with a reduction of 42, or 28 columns of images in 15 rows for a maximum of 420 frames with a reduction of 48. Microfiche are commonly produced by photographing from the original, hard copy onto 105 mm film, the header for identifying information likewise being photographed onto the film from original, hard copy.

A vast amount of data has previously been photographically recorded in microfilm, slide or aperture card format. The microfiche format is desirable by reason of its economy of storage space and ready accessibility of data recorded thereon and it is therefore desirable to provide apparatus for reformating previously recorded photographic data from microfilm, slide or aperture card format into microfiche format. It is further desirable that such apparatus have the capability of entering both input data and header data on the microfiche from the same input media, i.e., microfilm, slides and/or aperture cards. It is also desirable that the apparatus permit viewing each image to be reduced and reformated for editing and improvement purposes so that any image can be omitted or can be improved by varying the exposure, modifying the color balance or correcting the centering. It is further desirable that the apparatus have the capability of simultaneously reformating two different images, for example one on 35 mm roll film and one on a 35 mm slide.

SUMMARY OF THE INVENTION

The invention, in its broader aspects, includes a light source and means for directing the light from the source in at least one of first and second substantially mutually perpendicular axes which intersect at a predetermined point. Means are provided for advancing developed, photographic roll film in a first plane past a first location, the first axis passing through the first location and being substantially perpendicular to the first plane, the first location being spaced from the intersection point on one side thereof. Means are provided for positioning a developed, photographic slide at a second location in a second plane substantially perpendicular to the first plane, the second axis passing through the second location and being substantially perpendicular to the second plane, and the second location being spaced from the intersection point on one side thereof. Light beam splitting means is provided at the intersection point for passing a part of the total light in one of the first and second axes and reflecting the remaining part in the other of the first and second axes. Viewing screen means is provided on one of the axes spaced from the intersection point on the other side thereof for viewing the light image on the one axis from the beam splitting means, and means is provided for positioning unexposed and undeveloped photographic film in a third plane at a third location, the other of the axes passing through the third location and being substantially perpendicular to the third plane, the third location being spaced from the intersection point on the other side thereof so that the unexposed and undeveloped film is exposed to the light image on the other axis from the beam splitting means.

In the preferred embodiment of the invention, means are provided for supporting the unexposed and undeveloped film and selectively moving the same in X and Y axes in a plane parallel with the third plane thereby selectively to position the image projected on the unexposed and undeveloped film.

It is accordingly an object of the invention to provide apparatus for reformating previously photographed data.

Another object of the invention is to provide improved apparatus for reformating previously photographed data in microfiche format.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Referring now to FIGS. 1 – 7 of the drawings, the reformating apparatus of the invention, generally indicated at 20, includes single illumination system 22, to be hereafter more fully described, which directs light in axis 24. Mirror 26 is pivoted, as at 28, from the position shown in solid lines in FIG. 1A and in FIG. 2, to the position shown in dashed lines, thereby selectively to reflect light from axis 24 to axis 30 perpendicular to axis 24, or to permit light to continue in axis 24. Alternatively, mirror 26 may be a beam splitting mirror fixedly mounted in the position shown in solid lines in FIGS. 1A and FIG. 2 thereby to pass a predetermined part of the light from illumination system 22 in axis 24 and to reflect the remaining part in axis 30.

Figure 1A:
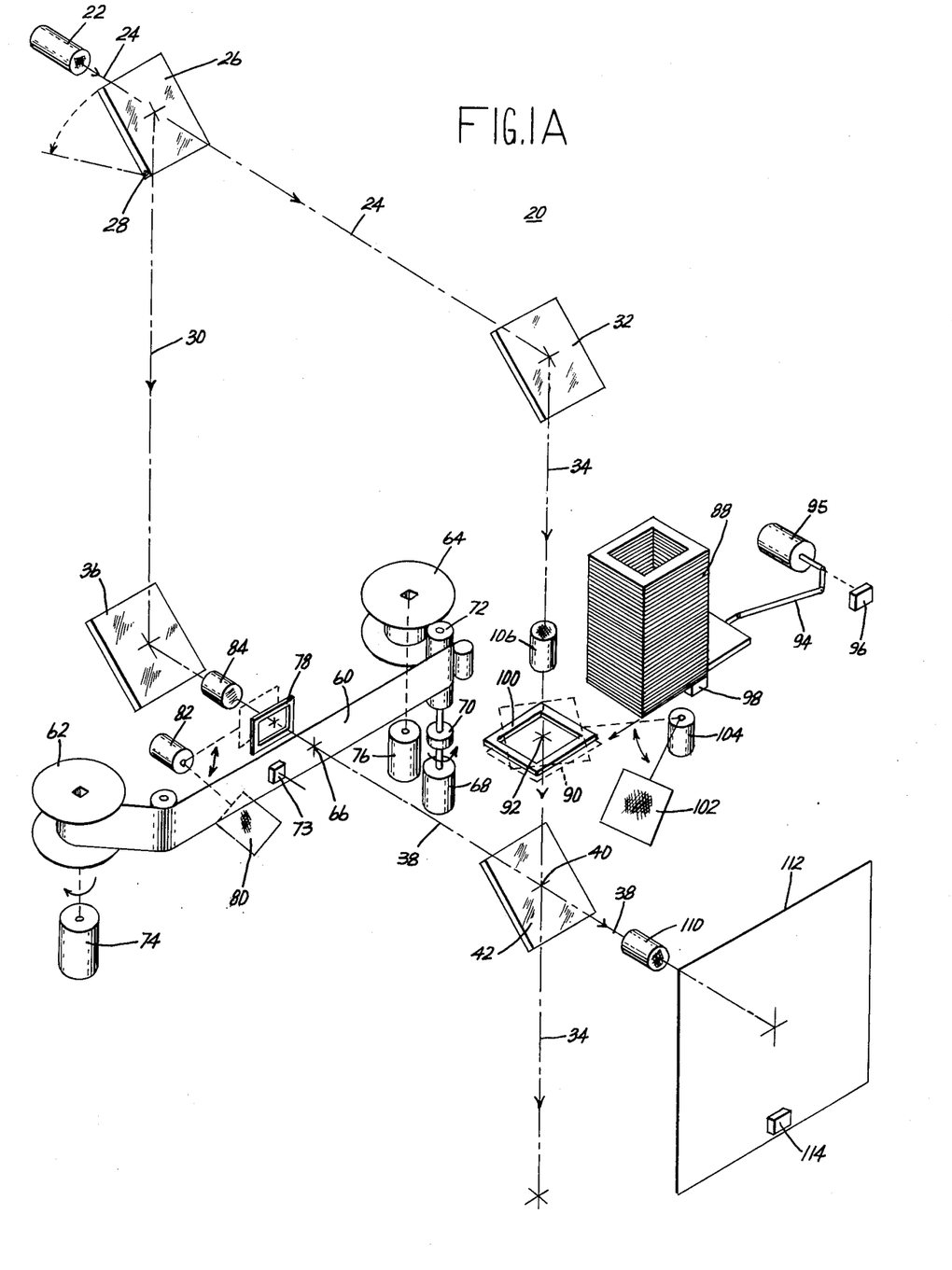
FIG. 1A is a perspective view schematically showing part of the reformating apparatus of the invention.
Figures 2, 8:
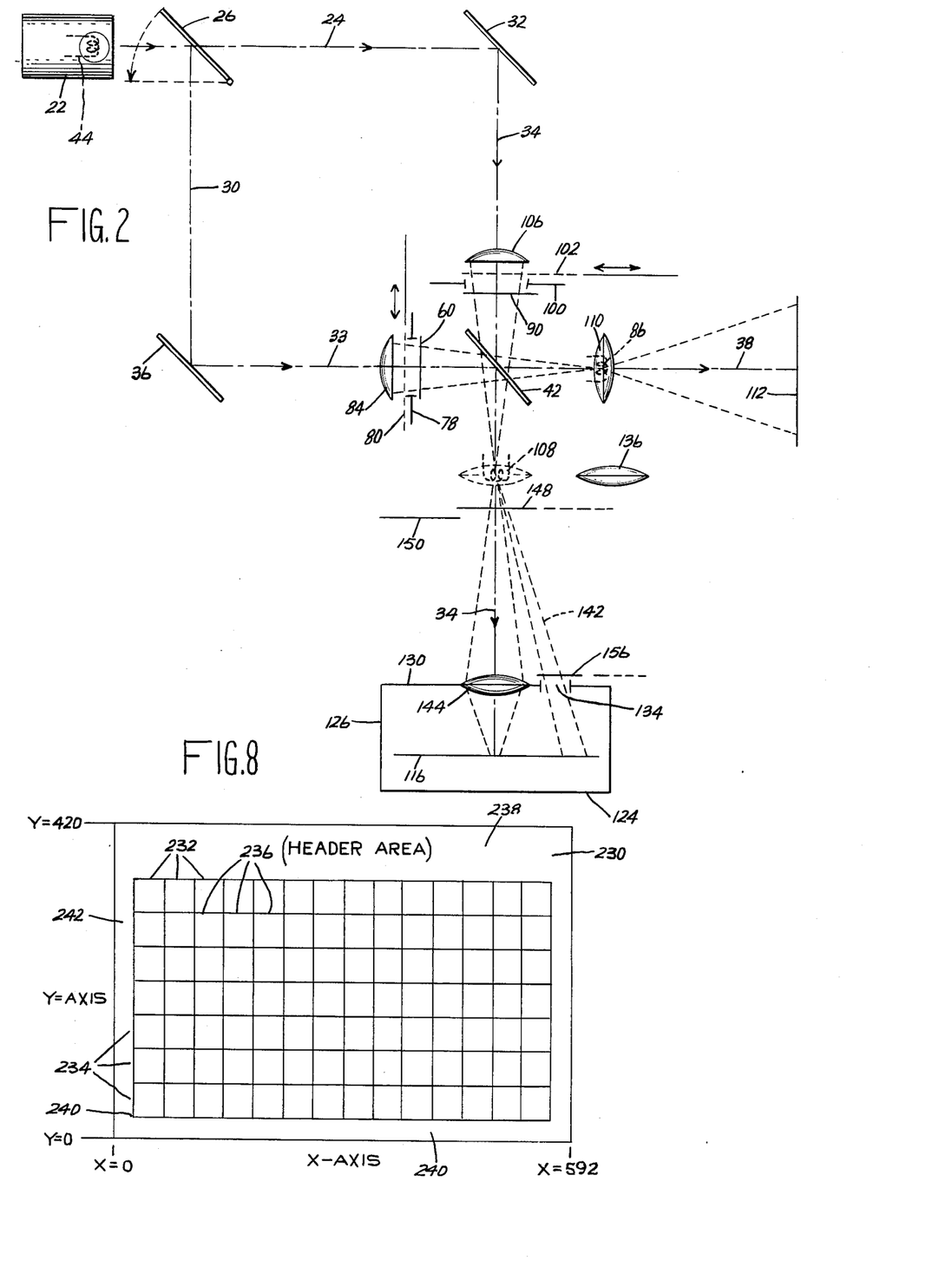
FIG. 2 is a side view schematically showing the invention.
FIG. 8 shows a typical 98-frame microfiche.

Mirror 32 reflects light from axis 24 to axis 34 perpendicular thereto, and mirror 36 reflects light from axis 30 to axis 38 perpendicular thereto. Axes 34 and 38, which are perpendicular, intersect at point 40. It will be observed that axes 24, 30, 34, 38 define a rectangle and lie in a single plane.

Beam splitting mirror 42 is positioned at intersection point 40, passing a predetermined part of the light in axis 38 and reflecting the remaining part in axis 34, and likewise passing a predetermined part of the light in axis 34 and reflecting the remaining part in axis 38.

Figure 3:
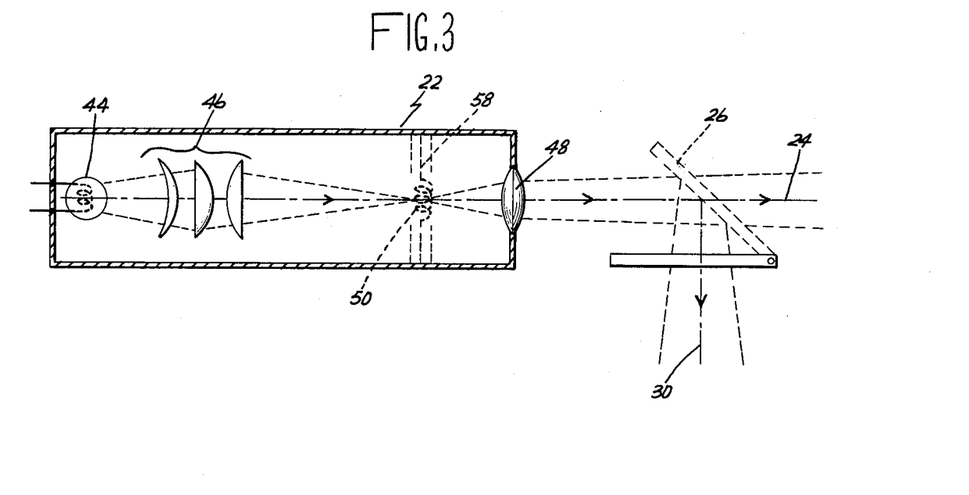
FIG. 3 is a side view schematically showing the illumination system incorporated in the apparatus of the invention.
Figure 4:
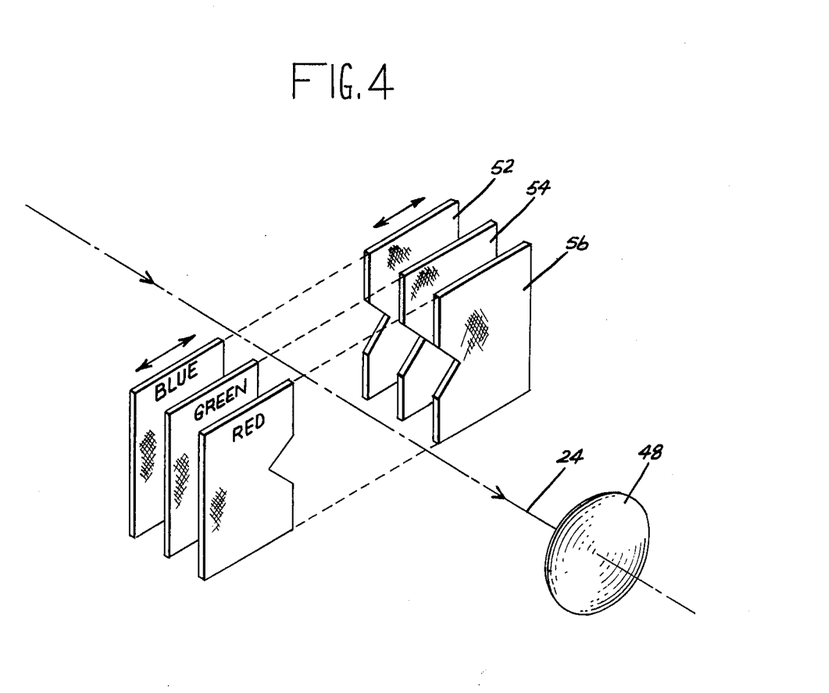
FIG. 4 is a fragmentary view in perspective showing the dichroic color filter assembly usable in the illumination system of FIG. 3.

Referring specifically to FIG. 3, illumination source 22 comprises light source 44, condensing lens system 46 and relay lens 48. Condensing lens 46 focuses a light image of light source 44 at point 50 at which blue, green and red filters 52, 54, 56 (FIG. 4) forming reflecting dichroic color filter assembly 58 may selectively be positioned. It will be understood that relay lens 48 provides a uniform field of light in axes 24, 30.

Developed roll film 60, which may be 35 mm or 16 mm, on spools 62, 64 is advanced in a plane perpendicular to axis 38 past location 66 on axis 38. Bidirectional, gear-reduced direct current motor 68 drives film 60 in either direction at slow speed through clutch 70 and capstan drive roller 72. Alternating current torque motors 74, 76 connected to spools 62, 64 are normally operated at reduced power to provide constant tension in both directions on film 60. In order to provide for advancing film 60 at a fast rate, full power is supplied to the respective motor 74, 76 while slow speed drive motor 68 is disengaged from capstan drive roller 72 by deenergizing clutch 70.

Film gate 78 is positioned on axis 38 directly behind film 60. Diffuser plate 80 formed of thin light-scattering material is selectively moved into and out of axis 38 by rotary solenoid 82. Aperture lens 84 on axis 38 focuses a light image of the light source 44 at points 86 and 108 (FIG. 2). Detector 73 provides a signal indicating that the available supply of roll film 60 is exhausted.

Stack 88 of developed photographic slides, such as 35 mm, is accommodated in a magazine (not shown), individual slides 90 being sequentially positioned at location 92 on axis 34, in a plane perpendicular to axis 34, by slide feeding mechanism 94 driven by gear-reduced direct current motor 95. Microswitch 96 detects one full revolution of the output shaft of motor 95, and detector 98 senses removal of the last slide from the magazine.

Film gate 100 is positioned adjacent slide 90 at location 92. Light diffuser 102 is selectively moved onto and away from axis 34 by rotary solenoid 104. Aperture lens 106 on axis 34 focuses a light image of light source 44 at points 86 and 108 (FIG. 2).

Viewing or enlarging lens 110 at point 86 on axis 38 projects the light image on axis 38 onto viewing screen 112. Photo detector 114 on viewing screen 112 is used to detect blip marks or perforations on film 60 for proper positioning of the data thereon.

Figure 1B:
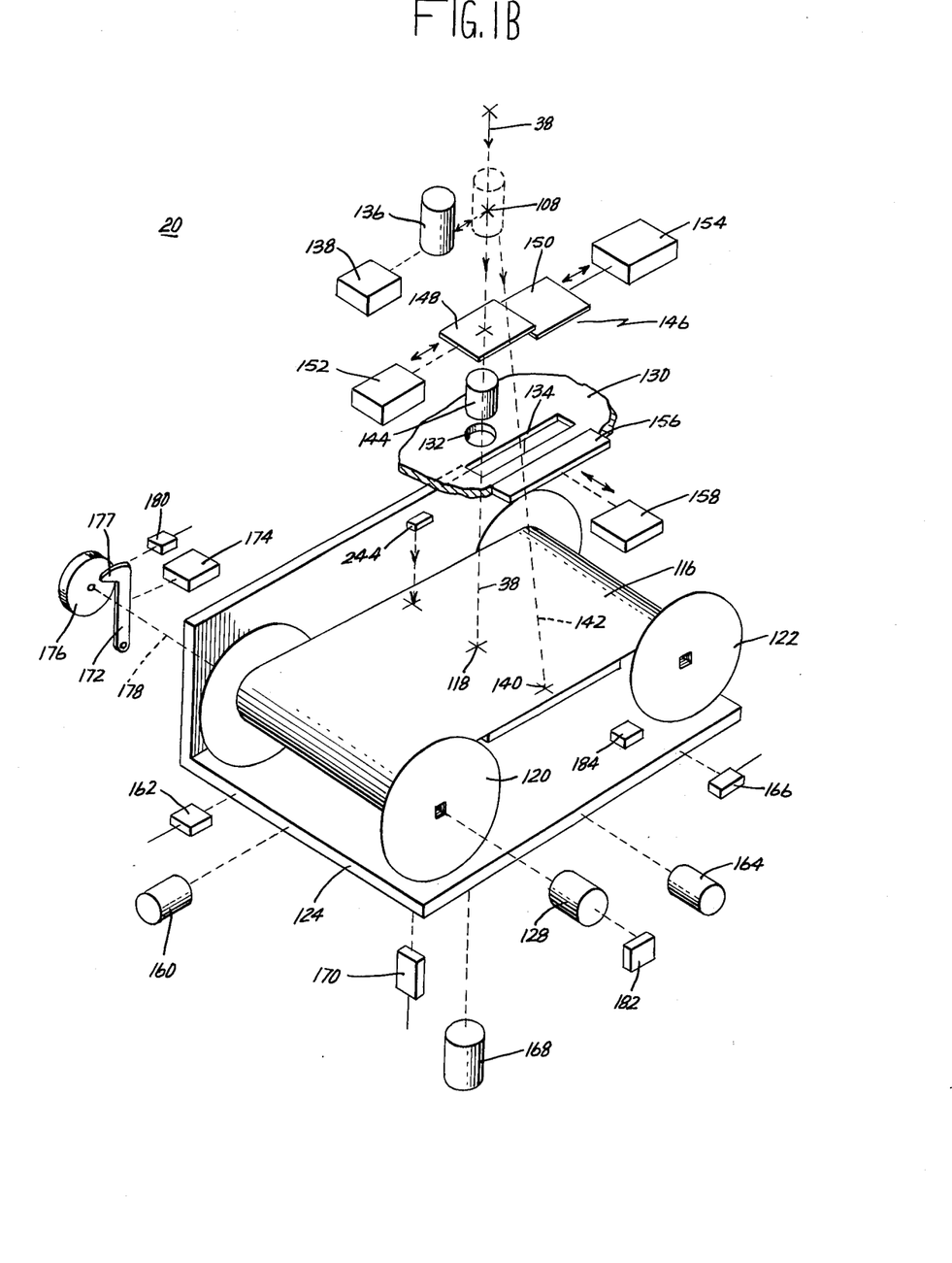
FIG. 1B is a perspective view schematically showing the remaining part of the reformating apparatus of the invention.
Figure 7:
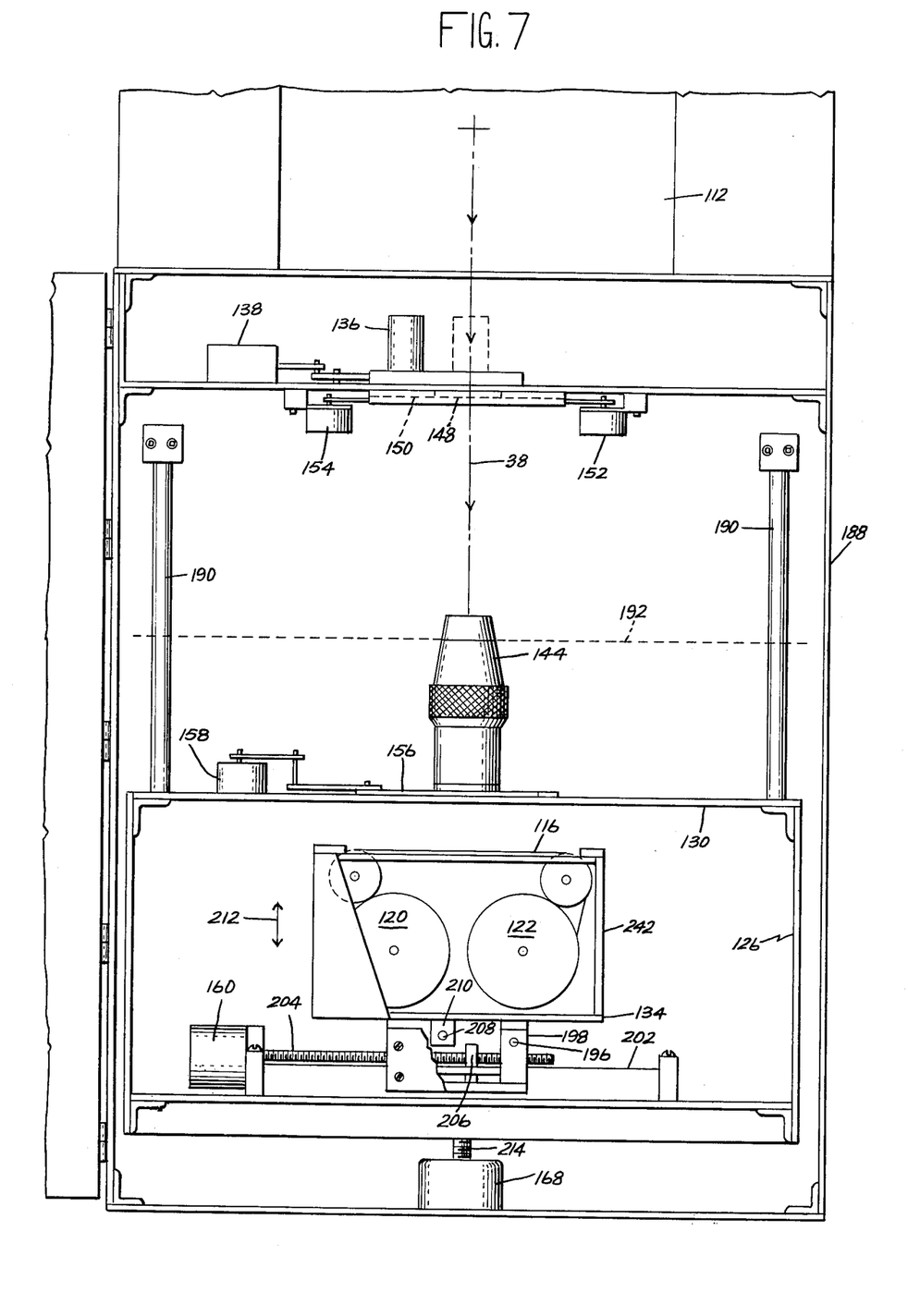
FIG. 7 is a side view showing further mechanical details of the apparatus shown in FIG. 1B.

Unexposed and undeveloped roll film 116, such as 105 mm, is advanced in a plane perpendicular to axis 38 past location 118 on axis 38. Unexposed and undeveloped roll film 116 is advanced by spools 120, 122 mounted on stage 124 in housing 126 (FIG. 7). Gear-reduced direct current motor 128 advances undeveloped film 116 past location 118. Housing 126 has top wall 130 having opening 132 on axis 38 therein, and elongated window 134 off-set from opening 132.

Header lens 136 is selectively moved onto axis 38 at point 108 by linear solenoid 138. When in position on axis 38 at point 108, header lens 136 projects a light image through window 134 in wall 130 onto roll film 116 at location 140, as shown by dashed lines 142. Reduction lens 144 on axis 38 is carried by wall 130 over opening 132 and serves to reduce the size of the light image projected on roll film 116 at location 118.

Focal plane shutter assembly 146 comprises shutter leaves 148, 150 respectively actuated by rotary solenoids 152, 154. In conventional fashion, shutter leaf 148 is actuated first by solenoid 152 to initiate exposure of unexposed and undeveloped film 116, followed by actuation of shutter leaf 150 by solenoid 154 to terminate the exposure, both leaves thereafter returning to the closed position as shown in FIG. 1B. Header window 134 in wall 130 is selectively opened and closed by gate 156 actuated by solenoid 158.

Stage 124 is moved in its X axis away from and toward an X=0 reference position by stepper motor 160, the reference position being detected by detector 162. Stage 124 is moved in the Y axis away from and toward a Y=0 reference position by stepper motor 164, detector 166 detecting presence of stage 124 at the reference position. Stage 124 is moved vertically in the Z axis in both directions away and toward a Z—0 reference position by stepper motor 168, presence of stage 134 at the reference position being detected by detector 170.

Advance of unexposed and undeveloped film 116 by motor 128 is preceded by actuation of stop arm 172 by solenoid 174. Stop arm 172 normally engages a notch in cam 176 on shaft 178 of spool 120. Detector 180 detects actuation of stop arm 172 to remove the same from notch 177. Detector 182 provides a signal indicating that one incremental advance of unexposed and undeveloped film 116 has been completed. Detector 184 provides a signal indicating that the available supply of unexposed and undeveloped film 116 has been exhausted. LED 244 is a light generator used to create cut marks on the 105 mm unexposed and undeveloped film 116.

It will now be seen that roll film 116 may be selectively moved in X and Y axes in a plane parallel to the plane of location 118 thereby selectively to position location 118 at selected positions on unexposed and undeveloped film 116 to provide a microfiche, and that unexposed and undeveloped film 116 is also selectively movable in a Z axis coincident with axis 38 thereby selectively to determine the size of each individual image projected on unexposed and undeveloped film 116.

Figure 5:
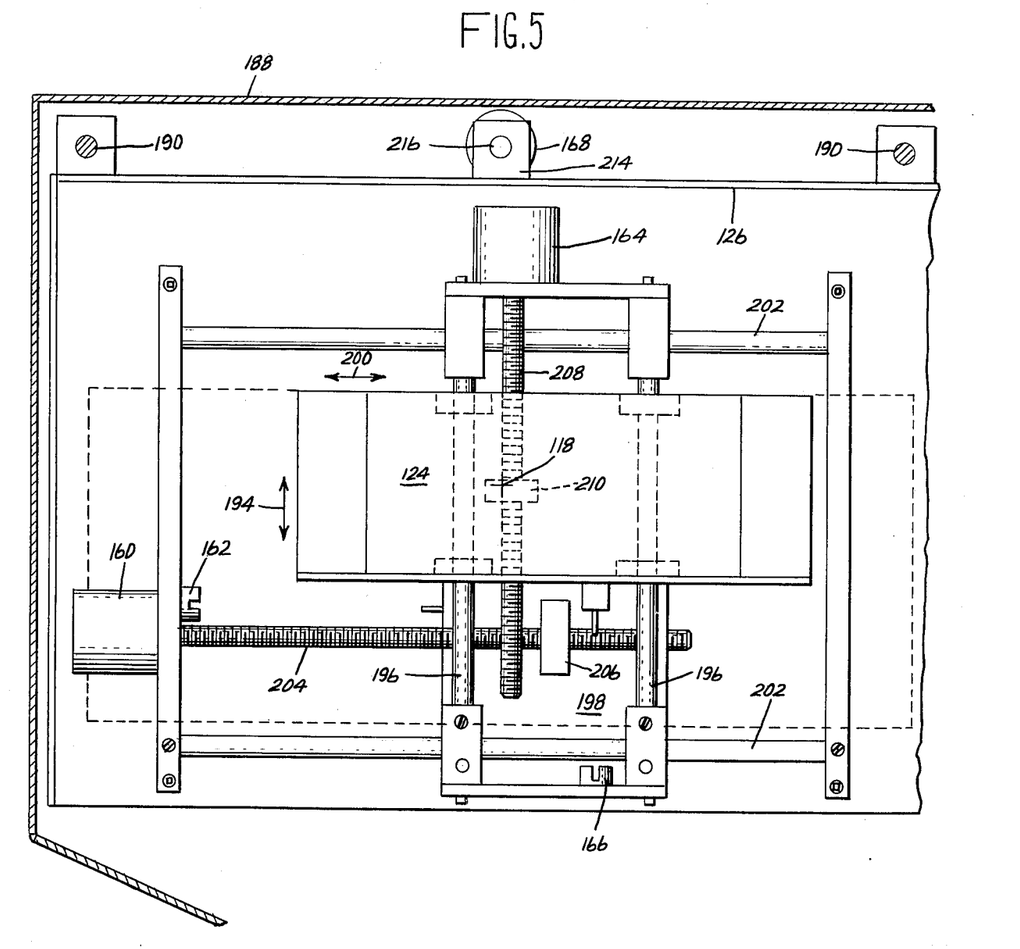
FIG. 5 is a top cross-sectional view showing the supporting stage for the undeveloped film and its X—Y positioning mechanism.
Figure 6:
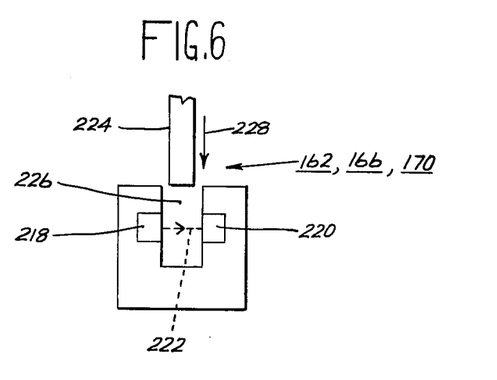
FIG. 6 is a fragmentary view showing the X and Y stage reference position detectors.

Referring now particularly to FIGS. 5, 6 and 7, apparatus 20 includes enclosure 188 having spaced, parallel, vertically extending bars 190 mounted therein which support housing 130 for vertical movement in Z axis 212 in both directions (plus and minus) away from and toward the Z=0 reference position, as shown by dashed line 192 in FIG. 7; housing 130 is shown in the negative Z maximum position in FIG. 7. Stage 124 is mounted for movement in Y axis 194 (FIG. 5) on spaced parallel bars 196 mounted on carriage 198. Carriage 198 is mounted for movement in X axis 200 on spaced, parallel bars 202 mounted on housing 126. Stepping motor 160 moves carriage 198 and stage 124 in the X axis 200 on bars 202 by means of lead screw 204 engaging nut 206 mounted on carriage 198. Stepping motor 164 moves stage 124 in the Y axis 194 on bars 196 by means of lead screw 208 engaging nut 210 secured to stage 124. Stepping motor 168 moves housing 126, carriage 198 and stage 124 in the Z axis 212 by means of lead screw 214 engaging nut 216 secured to housing 126.

Referring specifically to FIG. 6, detectors 162, 166, 170 respectively comprise light emitting diode (LED) 218 and phototransistor 220 normally receiving light from LED 218, as indicated by the dashed line 222, and movable protrusion 224 which enters space 226 between LED 218 and phototransistor 220, as shown by arrow 228, when stage 124 is in the respective X, Y, and Z reference positions, thus breaking light beam 222.

Referring briefly to FIG. 8, a typical microfiche 230 is shown having 14 columns 232 and 7 rows 234 providing 98 images 236. Header area 238 is provided at the top of microfiche 230 for header, i.e., identifying data. Margins 240, 242 are provided, typically 4 mm. Recalling that the typical microfiche is 105 mm in the Y axis and 148 mm in the X axis, stepping motors 160, 128 move stage 124 in one-quarter millimeter increments and thus, the Y dimension of microfiche 230 is 420 increments, the X dimension is 592 increments, and the location of the lower lefthand corner 241 of the image area is X=16 and Y=16.

While apparatus 20 has thus far been described in conjunction with 105 mm unexposed and undeveloped roll film 116, it will be readily understood that if mere photocopying of previously photographed roll film or slides is desired, 105 mm film magazine 242 (FIG. 7) can be replaced by a 16 or 35 mm film magazine. It will also be readily seen that a magazine and feeder for aperture cards may be substituted for the magazine and feeder for slides 88.

Figure 9:
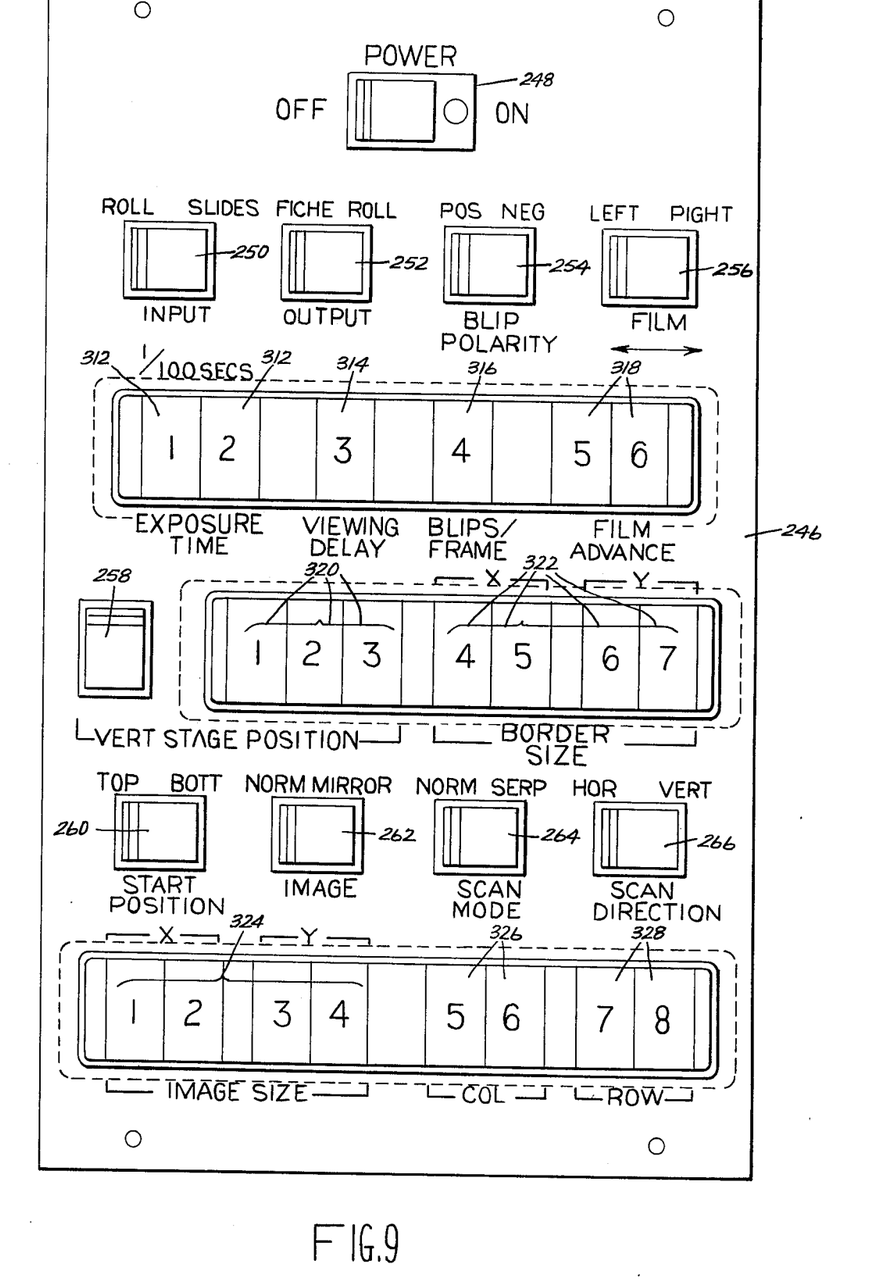
FIG. 9 is a top view of one of the control panels for the apparatus of the invention.
Figure 10:
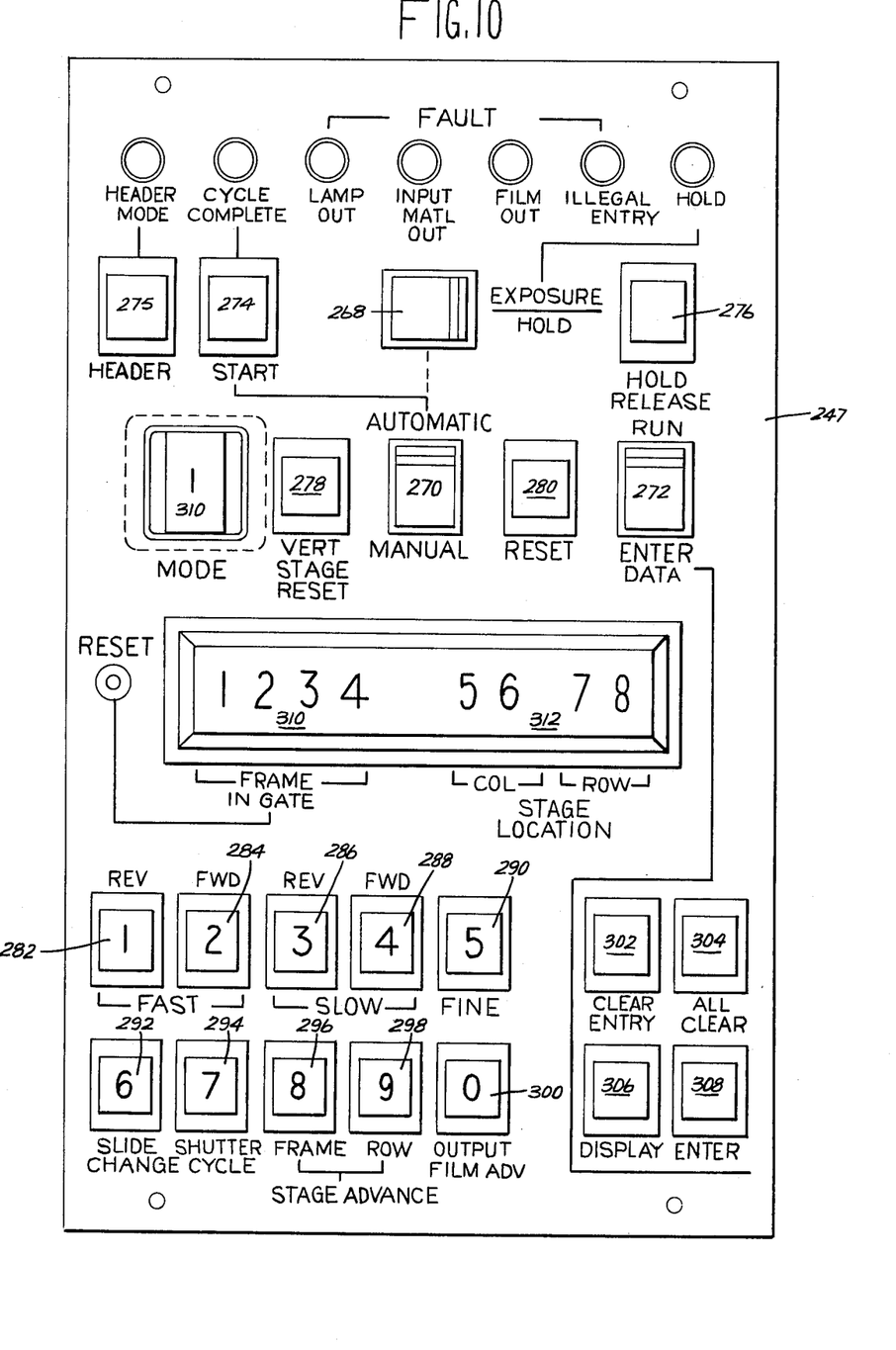
FIG. 10 is a top view showing the other control panel.
Figure 11:
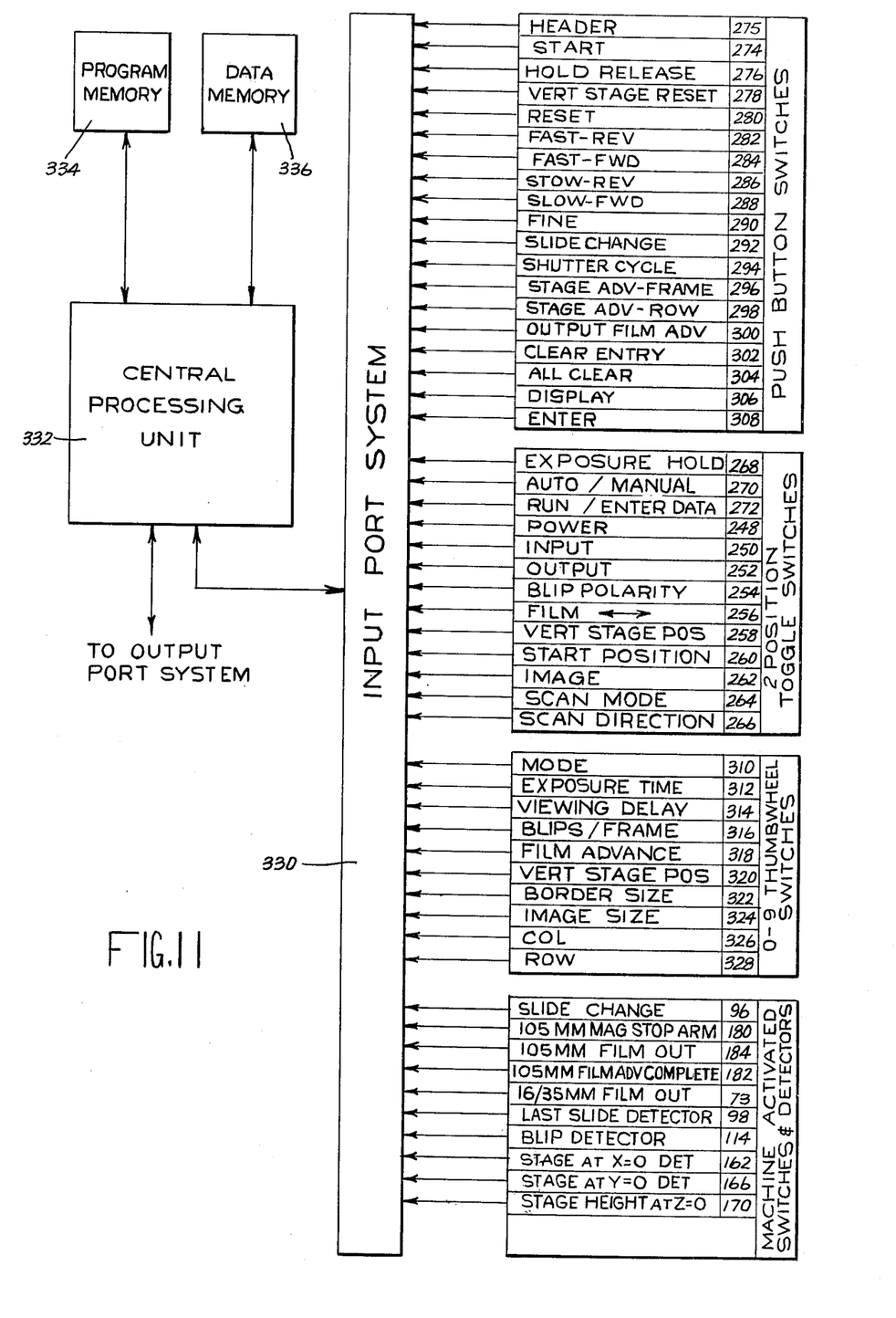
FIG. 11 is a functional diagram showing the control system for the apparatus of the invention and its inputs.
Figure 12:
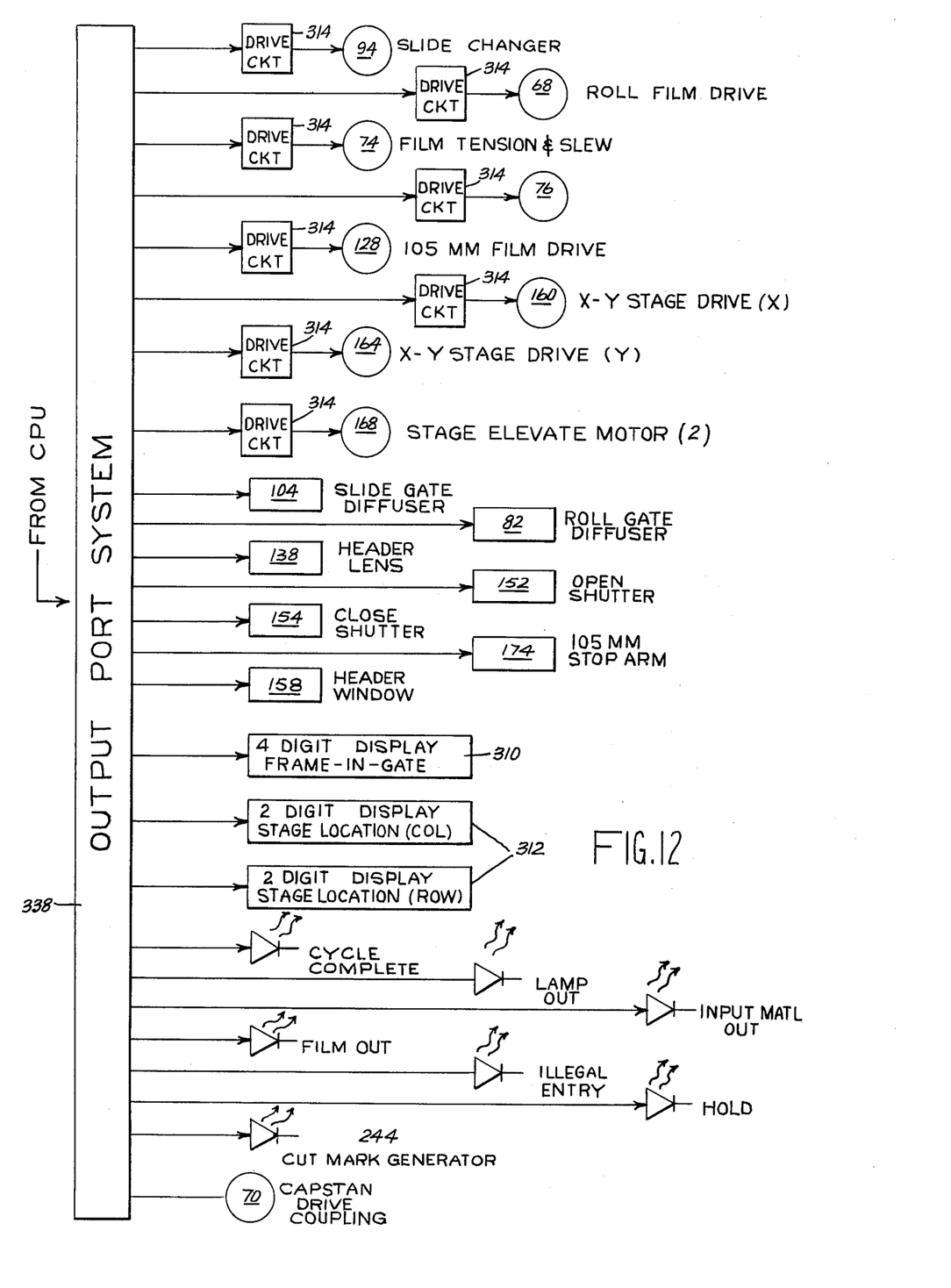
FIG. 12 is a functional diagram showing the outputs from the control system for the apparatus of the invention.

Referring now to FIGS. 9 and 10 which are useful in explaining the mode of operation of apparatus 20 in conjunction with FIGS. 11 and 12, control panels 246, 247 include the following switches:

Referring now to FIGS. 11 and 12, the push-button switches, 2-position toggle switches and the 0-9 thumbwheel switches described above in connection with FIGS. 9 and 10 along with detectors 73, 96, 98, 114, 162, 166, 170, 180, 182, 184 (FIG. 1) comprise data inputs to input port system 330 of special purpose computer 332 having program memory 334 and data memory 336. Computer 332 may be of the type manufactured by Intel Corporation including an 8080A, 8-bit microprocessor chip, an 8228 microprocessor control chip and an 8224 clock oscillator chip. Program memory 334 may include six Intel 2708 programable, read only memory chips each having the capability of storing 1024, 8-bit words. Data memory 336 may comprise four Intel 2101-2 random access memory chips.

Output ports 338 of computer 332 are coupled to the drive motors, solenoids and digital indicators described above, to the pilot lights shown on FIG. 10, and cut mark generator 244. It will be understood that the several drive motors 68, 74, 76, 94, 128, 164, 168 are each energized through a conventional drive circuit 314.

Reference to FIGS. 9 and 10 will indicate that the specific apparatus 20 illustrated is capable of a number of different types of operation, both manual and automatic. Mode switch 310 is used to select a particular preprogrammed mode of operation provided by the program chips. For example, mode "1" may contemplate automatically printing on the microfiche 116 all images on input roll film 60, in sequence, until the microfiche is completely filled, and then printing header information from a slide 90. A second mode may contemplate printing the images from the input film 60 only in certain frames of the microfiche whereas, mode "3" may contemplate printing all of the images from the input film except certain frames. The identity of such specified frames may be selected by push-button switches 282–300 which, with run/inter data switch 272 in the "enter data" position, function as programming keyboard switches.

For example, in typical full automatic operation, printing from input roll film 60 onto microfiche 116 having 420 frames in 28 columns and 15 rows with

| Two-Position Toggle Switches | Push-Button Switches | 0-9 Thumbwheel Switches | Digital Indicators |
|---|---|---|---|
| Power-on/off-248 | Start-274 | Mode-310 | Frame in gate-310 |
| Input-roll/slides-250 | Header-275 | Exposure time-312 | Stage location-312 |
| Output-fiche/roll-252 | Hold release-276 | Viewing delay-314 | |
| Blip polority-positive/negative-254 | Vertical stage reset-278 | Blips per frame-316 | |
| | Reset-280 | Film advance-318 | |
| | Fast reverse-282 | Vertical stage position-320 | |
| | | Border size-322 | |
| | | Image size-324 | |
| Film direction left/right-256 | Fast forward-284 | Column-326 | |
| Vertical Stage position-plus/minus-258 | Slow reverse-286 | Row-328 | |
| | Slow forward-288 | | |
| Start position-top/bottom-260 | Fine-290 | | |
| Image-normal/mirror-262 | Slide change-292 | | |
| | Shutter cycle-294 | | |
| Scan mode-normal/serpentine-264 | Stage advance frame-296 | | |
| | Stage Advance row-298 | | |
| Scan direction-horizontal/vertical-266 | Output film advance-300 | | |
| Exposure-hold-268 | Clear entry-302 | | |
| Automatic/manual-270 | All clear-304 | | |
| | Display-306 | | |
| Run/enter data-272 | Enter-308 | | | reduction of 48 and with the printing proceeding in normal, horizontal raster fashion, input switch 250 is positioned at "roll", output switch 252 is positioned at "fiche" and film switch 256 is positioned for the appropriate direction of movement of roll film 60. The desired exposure time is then set in thumb switches 312, the viewing delay time during which each image is displayed on the viewing screen 112 is set in thumbwheel switch 314, and the number of indexing blips per frame on the input film 60 is set in thumbwheel switch 316. Switch 318 sets the digital advance of the output film. Blip polority switch 254 is set to "positive" or "negative" depending on whether the blips or index marks on roll film 60 used for indexing from frame to frame are "negative", i.e., a light-to-dark transistion, or "positive", i.e., a dark-to-light transistion.

Vertical or Z axis position of stage 124 is then determined, above (plus) or below (minus) the Z=0 line 192 being determined by switch 258, and is set into thumbwheel switch 320, and the desired border size is set in thumbwheels 322. The position of starting of scanning on the microfiche is set by switch 260, the scan mode switch 264 is set to normal and the scan direction 266 is set to vertical. The image switch 262 is set to "normal" or "mirror" to determine the direction of scanning, i.e., from left to right or right to left. Thumb switches 324 are set to the desired image size and the number of columns and rows on the microfiche is set in thumb switches 326, 328. It will be understood that in the illustrated embodiment, the proper vertical stage position is determined from the desired image size by reference to a chart.

With switch 270 positioned on "automatic", switch 272 positioned on "run" and mode switch 310 set to the proper mode (such as mode "1"), push-button start switch 274 is depressed momentarily to initiate a cycle of operation in which roll film 60 is advanced incrementally sequentially to project each image thereon on viewing screen 112 without diffuser 80 in place. After each viewing delay, diffuser 80 is moved into position to reduce the amount of light and shutters 146 are actuated to project and thus print each image on unexposed and undeveloped roll film 116 at the proper location, in sequence, stage 124 being moved to the next position after each exposure. Assuming the header information for the particular microfiche is on a slide 90, stage 124 will then be moved to the proper location, slide 90 will be positioned at location 92 for viewing on display screen 112 without diffuser 102, diffuser 102 is then positioned on axis 34, header lens 136 is positioned on axis 38, gate 156 is opened, and then shutters 146 are opened to expose the header information on undeveloped film 116 at location 140.

Assuming manual rather than automatic operation is desired, switch 270 is positioned at "manual" and the operator then controls the operation of the apparatus by manipulation of push-button switches 282-300.

It will now be seen that with the apparatus of the invention, both image and header data can be entered, i.e., printed on microfiche from the same previously photographed input media, i.e., roll film or slides, or the immage data and header data can be on different input media. It will further be seen that the apparatus permits, editing, manipulating and modification of the image to be copied prior to exposure which permits omission, exposure variation, modification of color balance or centering correction of any image on a frame-by-frame basis.

While there have been described above the principles of this invention in connection with specific apparatus, it is to be clearly understood that this description is made only by way of example and not as a limitation to the scope of the invention.

What is claimed is:

1. Apparatus for reformatting previously photographed data comprising: a source of light; means for directing light from said source in at least one of first and second substantially mutually perpendicular axes which intersect at a predetermined point; means for advancing developed photographic film in a first plane past a first location, said first axis passing through said first location and being substantially perpendicular to said first plane, said first location being spaced from said point on one side thereof; means for positioning a developed photographic slide at a second location in a second plane substantially perpendicular to said first plane, said second axis passing through said second location and being substantially perpendicular to said second plane, said second location being spaced from said point on one side thereof; light beam splitting means at said point for passing a part of the total light in one of said first and second axes and reflecting the remaining part in the other of said first and second axes; viewing screen means on said one axis spaced from said point on the other side thereof for viewing the light image on said one axis from said beam splitting means; and means for positioning unexposed and undeveloped photographic film in a third plane at a third location, the other of said axes passing through said third location and being substantially perpendicular to said third plane, said third location being spaced from said point on the other side thereof whereby said unexposed and undeveloped film is exposed to the light image on said other axis from said beam splitting means.

2. The apparatus of claim 1 wherein said directing means includes means for selectively directing light from said source in one or the other of said first and second axes.

3. The apparatus of claim 1 wherein said directing means includes means for simultaneously directing light from said source in both said first and second axes.

4. The apparatus of claim 1 wherein said directing means comprises first means for directing light from said source in at least one of third and fourth diverging axes, second means for directing light from said third axis in said first axis, and third means for directing light from said fourth axis in said second axis.

5. The apparatus of claim 4 wherein said axes mutually substantially define a rectangle and lie in a common plane normal to said first and second planes.

6. The apparatus of claim 4 wherein said light source is on one of said third and fourth axes, said first directing means comprising a mirror selectively movable between a first position on said last-named one axis and reflecting light from said source in the other of said third and fourth axes, and a second position removed from said last-named one axis thereby providing a direct light path from said source to the respective directing means on said last-named one axis, said second and third directing means being mirrors.

7. The apparatus of claim 4 wherein said light source is on one of said third and fourth axes, said first directing means comprising light beam splitting means for passing a predetermined part of the light from said source in said last-named one axis and reflecting the remaining part in the other of said third and fourth axes, said second and third directing means being mirrors.

8. The apparatus of claim 4 wherein said light source includes a single source of illumination, condensing lens means spaced from said illumination source on said last-named one axis for imaging said illumination source at a point on said last-named one axis spaced from said condensing lens means, and relay lens means on said last-named one axis and spaced from said last-named point for providing a uniform field of light from said illumination source.

9. The apparatus of claim 8 further comprising color filter means selectively positioned on said last-named one axis adjacent said point thereon.

10. The apparatus of claim 4 further comprising first lens means on said first-named one axis intermediate said light beam splitting means and said viewing screen means for projecting the light image thereon, second lens means on said first-named one axis intermediate said first location and one respective second and third directing means for forming a light image of said light source on said first lens means, and third lens means on said first-named other axis intermediate said second location and the other respective second and third directing means for focusing a light image of said light source at a point on said first named other axis intermediate said light beam splitting means and said third location.

11. The apparatus of claim 10 further comprising first light diffusing means and means for selectively moving the same onto said first-named one axis intermediate said second lens means and said first location for diffusing the light from said second lens means, and second light diffusing means and means for selectively moving the same onto said first-named other axis intermediate said third lens means and said second location for diffusing the light from said third lens means.

12. The apparatus of claim 10 further comprising fourth lens means on said first-named other axis intermediate said last-named point thereon and said third location for reducing the image size projected on said undeveloped film.

13. The apparatus of claim 12 further comprising fifth lens means and means for selectively moving the same onto said first-named other axis at said last-named point thereon for projecting a light image past said fourth lens means onto said undeveloped film at a position off-set from said first-named other axes.

14. The apparatus of claim 13 further comprising shutter means on said first-named other axis intermediate said fourth lens means and said last-named point for selectively exposing said unexposed and undeveloped film to the light images on said last-named other axis and from said fifth lens means.

15. The apparatus of claim 14 and further comprising a housing having a wall with first and second openings therein, said last-named positioning means and third location being in said housing, said third location being exposed to said openings, said fourth lens means being mounted on said wall and communicating with said first opening, and gate means on said wall for selectively opening and closing said second opening.

16. The apparatus of claim 15 further comprising means for selectively moving said housing on said first-named other axis toward and away from said light beam-splitting means thereby to determine the image size projected on said undeveloped roll film.

17. The apparatus of claim 1 wherein said roll film advancing means includes means for selectively moving said roll film rapidly in forward and reverse directions, and means for selectively moving said roll film slowly in forward and reverse directions.

18. The apparatus of claim 1 further comprising means for supporting said last-named positioning means, and means for selectively moving said supporting means in X and Y axes in a plane parallel with said third plane thereby selectively to position the image projected on said undeveloped film.

19. The apparatus of claim 18 further comprising lens means on said other axis for reducing the size of the image projected on said unexposed and undeveloped film.

20. The apparatus of claim 19 further comprising second lens means selectively movable onto said other axis for projecting a light image past said first-named lens means onto said unexposed and undeveloped film at a position off-set from said other axis.

21. The apparatus of claim 19 further comprising control means coupled to said moving means for actuating the same to position said supporting means at predetermined positions.

* * * * *